United States Patent [19]

Terada et al.

[11] 4,323,828
[45] Apr. 6, 1982

[54] APPARATUS FOR USE WITH A MOTOR DRIVE

[75] Inventors: Katumi Terada; Kazuyuki Nemoto, both of Hachioji, Japan

[73] Assignee: Olympus Optical Co. Ltd., Japan

[21] Appl. No.: 36,071

[22] Filed: May 4, 1979

Related U.S. Application Data

[63] Continuation-in-part of Ser. No. 807,396, Jun. 17, 1977, Pat. No. 4,219,764.

[30] Foreign Application Priority Data

Jul. 9, 1976 [JP] Japan .................. 51-92171

[51] Int. Cl.³ .............................. H02P 1/54
[52] U.S. Cl. ...................... 318/45; 318/48; 318/60; 318/63; 310/112; 74/665 GA
[58] Field of Search .............. 310/112, 113; 318/45, 318/46, 48, 49, 56, 57, 60, 62, 63, 86, 112, 67, 702, 703, 375, 376, 74; 74/665 GA; 353/95

[56] References Cited

U.S. PATENT DOCUMENTS

| 1,667,718 | 5/1928 | Connell | 318/112 X |
|---|---|---|---|
| 2,412,551 | 12/1946 | Pratt et al. | 353/95 |
| 2,515,982 | 7/1950 | Brane | 318/63 X |
| 2,578,015 | 12/1951 | Reinhard | 318/45 X |
| 2,621,225 | 12/1952 | Hargreaves et al. | 310/74 |
| 2,728,018 | 12/1955 | Moore | 318/48 |
| 2,763,823 | 9/1956 | Symes | 318/67 X |
| 3,166,952 | 1/1965 | Lang | 74/665 GA |
| 3,351,830 | 11/1967 | Samson et al. | 318/48 |
| 3,434,025 | 3/1969 | Parkinson et al. | 318/48 X |
| 3,454,779 | 7/1969 | Meijer | 310/112 X |
| 3,498,569 | 3/1970 | Kjos | 310/112 X |

Primary Examiner—B. Dobeck
Attorney, Agent, or Firm—Weinstein & Sutton

[57] ABSTRACT

An apparatus is provided for use with a motor drive for cancelling the electromagnetic reaction energies developed by a pair of drive motors upon rapid starting or sudden stopping, the latter occurring upon the application of dynamic braking to said motor drive. The apparatus comprises a pair of motors each provided with rotors preferably having moments of inertia which are substantially equal. The output shafts of the motors are operatively connected so as to rotate in opposing directions.

9 Claims, 4 Drawing Figures

F I G. 3
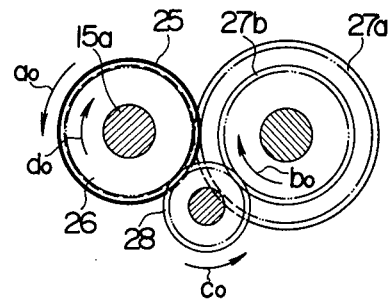
F I G. 4
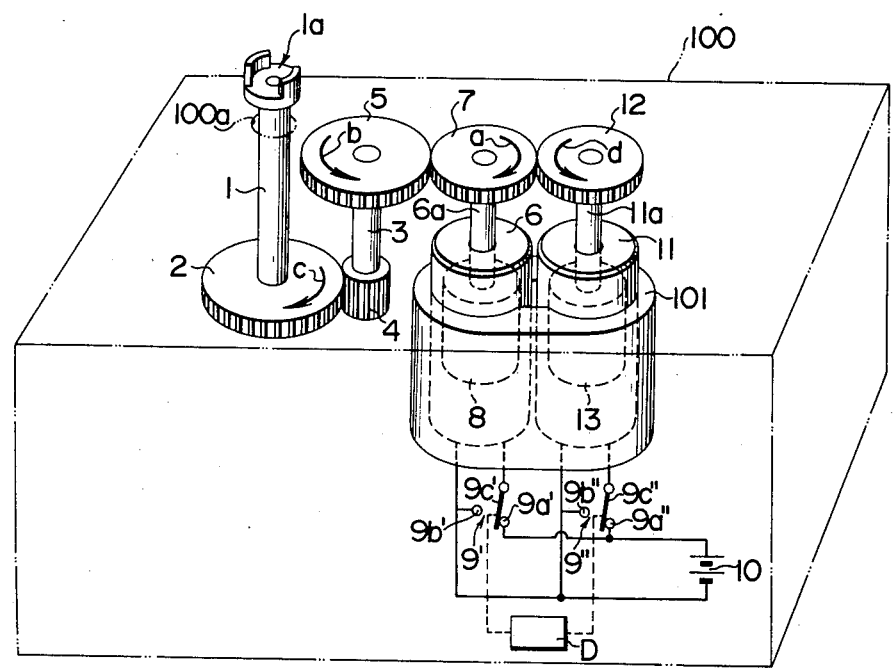

APPARATUS FOR USE WITH A MOTOR DRIVE

BACKGROUND OF THE INVENTION

This application is a continuation in part of application Ser. No. 807,396, filed June 17, 1977 now U.S. Pat. No. 4,219,764.

The invention relates to an apparatus for use with a motor drive.

For purpose of illustration, the invention will be described below in connection with a motor drive system associated with a film winding device of a photographic camera. However, the invention may be used in connection with any apparatus having drive means in which it may be desirable to significantly reduce and preferably to eliminate jolts to such apparatus due to sudden stops and starts of the drive means. Such film winding devices which have recently been introduced employ a motor for automatic film winding. As each frame of the film is advanced, the motor must be started rapidly and stopped suddenly by applying dynamic braking, giving rise to an electro-magnetic reaction energy developed by the motor, which reaction energy is in the opposite sense from the direction of acceleration or deceleration of rotation of the motor respectively. Such reaction energy may result in an impact being undesirably applied to the film winding device including the motor housing and a support therefor as well as to the camera body. In particular, such an impact to the camera body may cause a blurring of a resulting photograph.

SUMMARY OF THE INVENTION

It is an object of the invention to provide an apparatus for use with a motor drive which comprises a pair of motors whose rotors have moments of inertia which are substantially the same and whose output shafts are operatively connected and are arranged to rotate in directions opposing one another to eliminate the effect of electromagnetic reaction energy produced in the stator of each motor when each of the aforesaid motors are rapidly started or suddenly stopped by applying dynamic braking.

In accordance with the invention, when the motors are rapidly started or suddenly stopped by applying dynamic braking, the electromagnetic reaction energy produced in one of the motor housings is cancelled by the electromagnetic reaction energy produced in the other motor housing, precluding the occurrence of any impact to the apparatus incorporating the motor drive.

BRIEF DESCRIPTION OF THE DRAWINGS

FIG. 3 is a cross-section taken along the line III—III shown in FIG. 2; and

FIG. 4 is a perspective view of a further embodiment of the invention.

DESCRIPTION OF PREFERRED EMBODIMENTS

Figure 1:
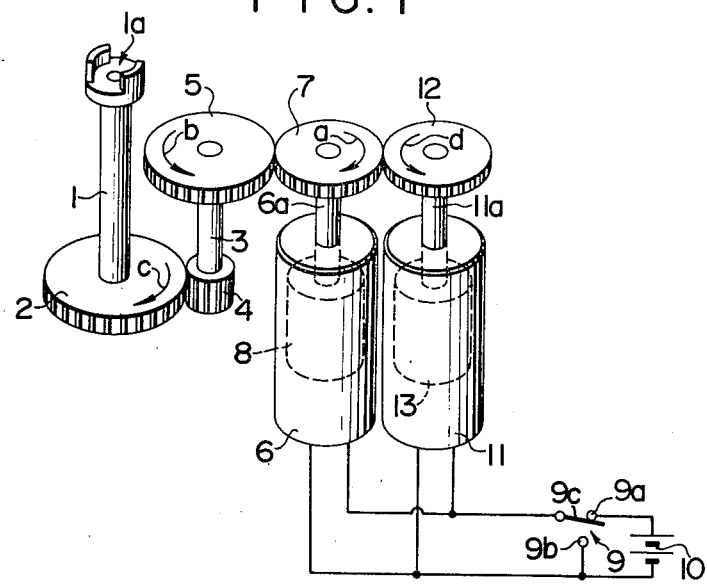
FIG. 1 is a perspective view of an apparatus constructed in accordance with one embodiment of the invention.

Referring to FIG. 1, there is shown one embodiment of the invention as applied to a film winding device of a camera, the camera being omitted for purposes of simplicity. The device includes a drive shaft 1 having an upper forked end 1a and fixed carrying a drive gear 2 at its lower end. A rotary shaft 3 has a pinion gear 4 fixedly mounted thereon, which gear meshes with the gear 2. A gear 5 of a larger diameter is fixedly mounted on the upper end of shaft 3 and is driven by meshing engagement with an output gear 7 fixedly mounted on the output shaft 6a of a drive motor 6 which motor may be of a conventional design. The shafts for gears 2, 4 and 5 are rotatably journaled in a casing 100 (shown in dotted fashion) of the film winding device. The means for rotatably supporting shafts 1 and 3 have been omitted for purposes of simplicity. The upper end of shaft 1 extends through a through-hole 100a provided in the upper surface of the casing 100, enabling the forked upper end 1a of shaft 1 to engage a film winding shaft (not shown for purposes of simplicity) in the camera body when the casing 100 of the film winding device is joined to the camera body. The motor 6 includes a rotor 8, and also a stator, commutator and brush assembly which are not shown for purposes of simplicity. Motor 6 is selectively connected through a change-over switch 9 with a power source 10. The switch 9 comprises stationary terminals 9a and 9b and a movable switch arm 9c. When switch arm 9c engages terminal 9a, motor 6 is energized. When the switch arm 9c is thrown to the terminal 9b, the coils of the motor 6 are short-circuited, thereby applying dynamic braking to the motor. Motor 11 is electrically connected in parallel with motor 6. Switch 9 operates motor 11 in the same manner as motor 6.

In operation, after a photographing operation is completed by a shutter release, the switch arm 9c may be thrown to the terminal 9a, whereupon the motor 6 is energized. Simultaneously an electromagnetic reaction energy is produced in the stator of the motor 6 by the accelerated rotation of the rotor 8, resulting in an impact to the motor housing and the casing 100 of the film winding device supporting the motor housing. Then the output gear 7 is driven for rotation in a direction indicated by an arrow a, for example, and its meshing gear 5 rotates in a direction indicated by an arrow b to transmit the rotating power to the drive gear 2 through the pinion gear 4, thus rotating the drive shaft 1 in a direction indicated by an arrow c. As the drive shaft 1 rotates, the film winding shaft (not shown) which is engaged by the forked end 1a of the shaft 1 winds up, i.e., advances the film frame on which a picture has been taken.

When one frame of the film is wound up, the switch arm 9c is thrown to the terminal 9b to short-circuit the coils of the motor 6, applying dynamic braking thereto. At this time an electromagnetic reaction energy is produced in the stator of motor 6 by the application of dynamic braking, applying an undesirable impact to the motor housing and the casing 100 supporting the housing of motor 6 in the same direction as that of rotation of the output shaft 6a.

In accordance with the invention, there is provided a revolving member which acts to cancel the electromagnetic reaction energy of the motor 6. In the embodiment shown in FIG. 1, the said revolving member comprises a rotor 13 of a motor 11 which is constructed in the same way as motor 6 and the rotor 13 preferably has a moment of inertia equal to that of the rotor 8 of the motor 6. The motor 11 is securely mounted in a motor supporting member 101, as is the motor 6. The member 101 is fixed to the casing 100. The motor 11 has an output shaft 11a on which an output gear 12 meshing with the gear 7, is fixedly mounted. Thus, gear 12 rotates in a direction indicated by an arrow d.

The motors 6 and 11 are rapidly started simultaneously or suddenly stopped simultaneously as the switch arm 9c is thrown to the terminal 9a or the terminal 9b, respectively. When the motors 6 and 11 are rapidly started or suddenly stopped by applying dynamic braking, an electromagnetic reaction energy is developed by each motor at this moment. However, since rotors 8 and 13 rotate in opposite directions the electromagnetic reaction energies developed by the motors 6 and 11 are created in the opposite directions and hence cancel each other since the rotors 8 and 13 have equal moments of inertia. Accordingly, no impacts occur in the casing 100 supporting the motors, which prevents harmful influences from being imposed on the photographing operation.

It is desirable that motors 6 and 11 be disposed as physically close to each other as is possible. When the two motors are used in the manner mentioned above, only one-half the output is required for each motor as compared with the use of a single motor. The power dissipation of each motor is also halved, thus resulting in a total power dissipation which is equal to that of a single motor having a power which is equal to sum of those of motors 6 and 11.

In the event that the operating characteristics of motors 6 and 11 are different from each other, a changeover switch assembly comprised of switches 9', 9" is provided for the motors as shown in FIG. 4. These switches are operated with some time lag corresponding to the difference between the characteristics of the motors. For example, a mechanical or electrical delay element D responsive to operations of one of the switches 9' (or 9") may be provided to operate the other switch 9" (or 9') after a predetermined delay. FIG. 4 shows a delay element D mechanically controlled by closure of one switch 9' (or 9") to close the other switch after a predetermined delay, thereby compensating for the differences between operating characteristics of the motors 6 and 11.

Figure 2:
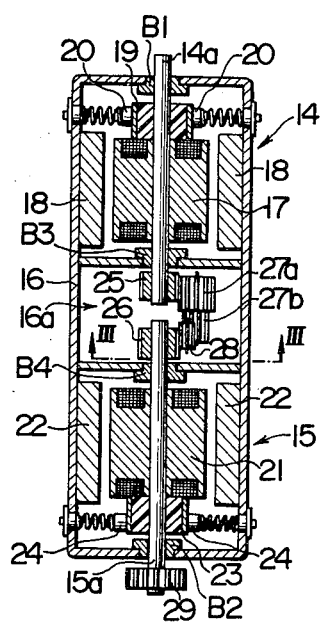
FIG. 2 is a sectional view of another embodiment.

FIG. 2 shows another embodiment in which a pair of motors 14, 15 are assembled within a common housing 16 and are connected in tandem by a gear train so that their output shafts 14a, 15a rotate in opposite direction. Specifically, the motor 14 is housed within the upper half of the elongated tubular housing 16 and comprises output shaft 14a, rotor 17, stator 18, commutator 19 and brushes 20. The motor 15 is housed within the lower half of the housing and comprises output shaft 15a, rotor 21, stator 22, commutator 23 and brushes 24. The top end of output shaft 14a is rotatably supported by a bearing B1 in alignment with the center axis of the housing 16. The bottom end of output shaft 15a is rotatably supported by bearing B2. Intermediate the respective motor compartments, the housing 16 includes a gear chamber 16a into which the output shafts 14a, 15a extend. Bearing B3 rotatably supports the lower end of shaft 14a and bearing B4 rotatably supports the upper end of shaft 15a. A pair of gears 25, 26 are fixedly mounted on the end of each of the respective shafts. The gear 25 is in meshing engagement with a gear 27a of a greater diameter, which forms part of a stepped connecting gear together with a gear 27b of a smaller diameter. The gear 27b is in meshing engagement with an intermediate gear 28 which in turn meshes with the gear 26. It will be seen that the gear train connects the output shafts 14a, 15a together in a manner such that they rotate in opposite directions. Specifically, referring to FIG. 3, it will be noted that when the shaft 14a and the gear 25 rotate in a direction indicated by an arrow $a_o$, the gear 27a which meshes with gear 25 will rotate in a direction indicated by an arrow $b_o$ together with its integral gear 27b while the intermediate gear 28 will rotate in a direction indicated by an arrow $c_o$ to cause the gear 26 and the output shaft 15a to rotate in a direction indicated by an arrow $d_o$. Thus the shafts 14a, 15a will rotate in opposite directions.

The rotors 17, 21 of motors 6 and 11 are preferably constructed so as to have equal values of moment of inertia. An output gear 29 is fixedly mounted on the lower end of the output shaft 15a which extends out of the housing 16. The operation of the rotor 17 is same as mentioned above with regard to rotor 21.

Furthermore, the members 25, 26, 27a, 27b, 28 employed for converting the directions of rotation as shown in FIG. 2 may be replaced by suitable transmission members such as a belt, a disc for friction drive and the like.

It should be understood that while the invention has been illustrated in connection with a film winding device, it is not limited thereto but is equally applicable to any other winding or take-up device incorporating a drive motor, including a tape take-up device of a tape recorder.

A latitude of modification, change and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein.

What is claimed is:

1. Apparatus for use with a motor drive comprising:
   a pair of motors each having a cooperating stator and rotor and an output shaft operatively driven by said rotor:
   the moments of inertia of said motors being substantially equal;
   circuit means including a power source for selectively energizing and deenergizing said pair of motors substantially simultaneously;
   means for maintaining said motors in fixed positions relative to one another;
   means including gear means operatively coupling the output shafts of said motors in such a manner that the output torque of the apparatus is substantially the sum of the torques of said motors and that the output shafts rotate in opposite directions, whereby the electromagnetic reaction energies developed by said motors when they are rapidly accelerated or decelerated, tend to cancel one another;
   said circuit means including switch means for simultaneously coupling said motors to said power source when said switch means is moved to a first position; and
   said switch means further including means for simultaneously applying dynamic braking to both of said motors when said switch means is moved to a second position.

2. The apparatus of claim 1 wherein said means for maintaining said motors in a fixed relationship relative to one another is adapted to maintain the output shafts of said motors aligned in parallel fashion.

3. The apparatus of claim 1 wherein said means for maintaining said motors in a fixed relationship relative to one another is adapted to maintain the output shafts of said motors aligned along a common axis.

4. The apparatus of claim 1 further comprising a drive shaft operatively coupled to one of said output shafts.

5. Apparatus according to claim 1 wherein said means for maintaining said motors in a fixed relationship to one another comprises means joined to said motors and adapted to retain said motors in close proximity to one another.

6. Apparatus according to claim 1 wherein said means for maintaining said motors in a fixed relationship relative to one another comprises a common elongated housing, said motors being at least partially inserted within said housing and secured thereto so that the output shafts of said motors are arranged to lie along a common axis.

7. Apparatus according to claim 6 wherein each of said output shafts extends toward one another;
said means operatively connecting said output shafts comprising gear means operatively coupling adjacent ends of said output shafts whereby said shafts are caused to rotate in opposite directions.

8. Apparatus according to claim 7 comprising a drive shaft and means operative to connect said drive shaft to one of said output shafts of said first and second motors.

9. Apparatus for use with a motor drive comprising a pair of motors each having a cooperating stator and rotor and an output shaft operatively driven by said rotor;
means for maintaining said motors in fixed positions relative to one another;
means operatively connecting the output shafts of said motors in such a manner that the output shafts rotate in opposite directions, whereby the electromagnetic reaction energies developed by said motors when they are rapidly accelerated or decelerated, tend to cancel one another;
a source of power;
first and second switch means, each associated with one of said motors and each being adapted to couple its associated motor to said source of power when moved to a first position;
means associated with said first and second switch means for applying dynamic braking to its associated motor when said first and second switch means are moved to a second position;
delay means responsive to movement of one of said first and second switch means to said second position for moving the remaining one of said first and second switch means to said second position after a predetermined time delay, the length of said delay compensating for the difference between the operating characteristics of said motors so that the electromagnetic reaction energies developed by said motors tend to cancel one another when the first and second switch means are moved to said second position.

* * * * *